P. CLAY.
NUT LOCK.
APPLICATION FILED MAY 23, 1907.

922,261.

Patented May 18, 1909.
2 SHEETS—SHEET 1.

WITNESSES:
Jesse C. Miller.
John Powers.

INVENTOR
Percy Clay.
BY Chandler Chandler
Attorney

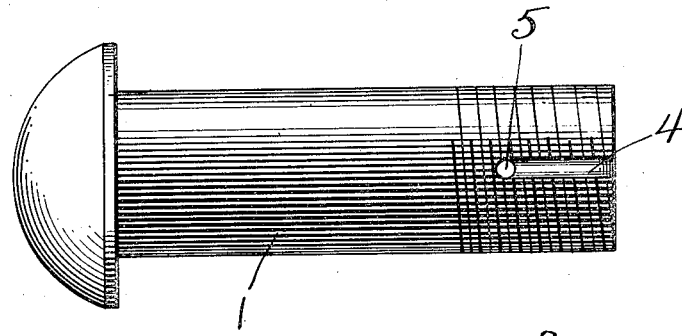
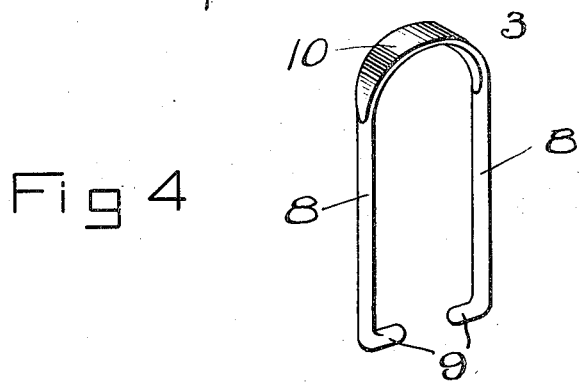
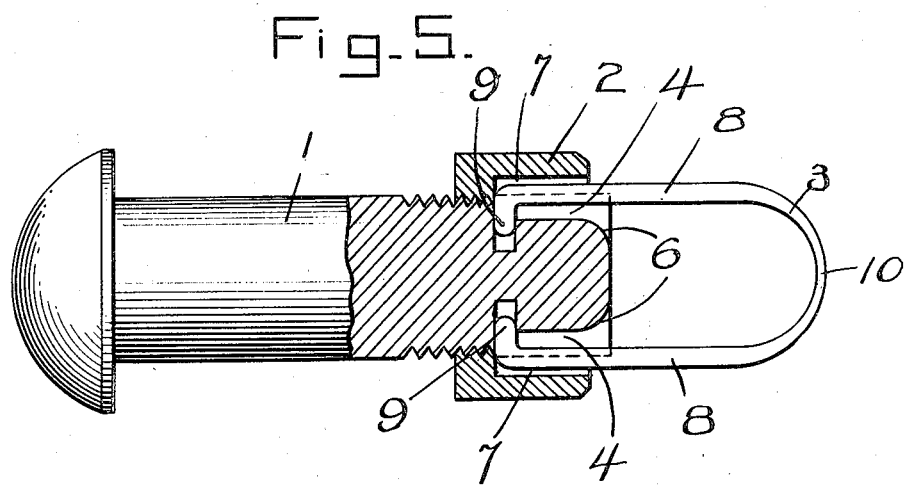

UNITED STATES PATENT OFFICE.

PERCY CLAY, OF GIBSON, LOUISIANA, ASSIGNOR OF ONE-HALF TO EDWARD WRIGHT, OF GIBSON, LOUISIANA.

NUT-LOCK.

No. 922,261.   Specification of Letters Patent.   Patented May 18, 1909.

Application filed May 23, 1907. Serial No. 375,319.

*To all whom it may concern:*

Be it known that I, PERCY CLAY, a citizen of the United States, residing at Gibson, in the parish of Terrebonne, State of Louisiana, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks, and it has particular reference to a nut lock which includes as a primary element of its construction, a resilient locking key yieldingly retained upon the bolt after removal or loosening of the nut and formed to engage the nut and the bolt and to hold them against relative rotation, the object being to provide a novel construction, combination, and arrangement of parts.

A further object of the invention is to so arrange the locking key, bolt and nut so that if stripping of the bolt or nut should occur after the bolt is seated, the locking key will assist in retaining the nut in position and prevent the entire removal thereof.

The details of the invention will appear in the course of the following description in which reference is had to the accompanying drawings forming a part of this specification, like characters of reference designating similar parts throughout the several views, wherein:—

Figure 1:
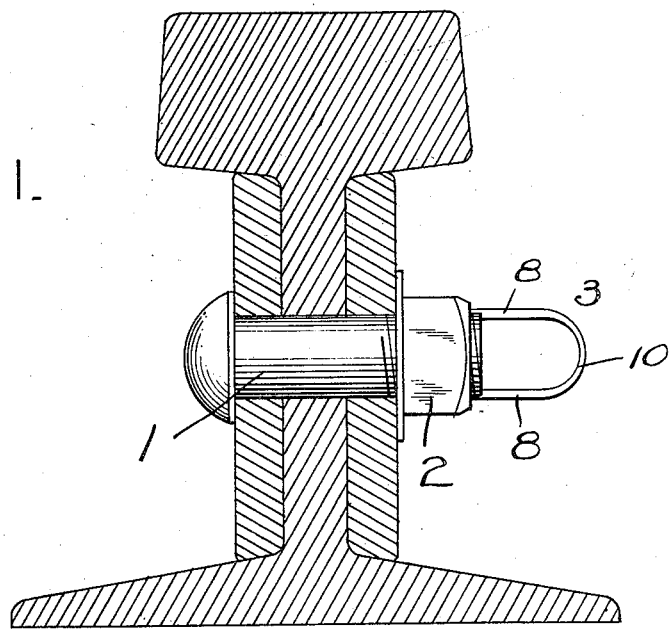
Figure 2:
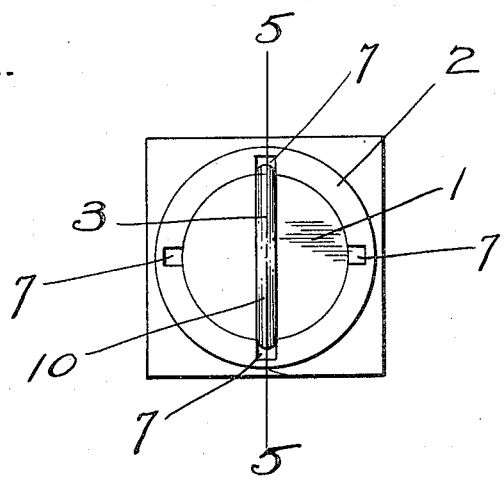

Figure 1 is an elevation showing the nut lock in its application to a rail joint of conventional form. Fig. 2 is an end elevation of the nut lock. Fig. 3 is a detail view of the bolt showing the longitudinal recesses which are provided at opposite sides thereof, and which at their inner ends are formed with deep extensions. Fig. 4 is a detail view of the locking key. Fig. 5 is a longitudinal section on the line 5—5 of Fig. 2.

Referring specifically to the accompanying drawings, the numeral 1 designates generally the bolt, the numeral 2, the nut, and the numeral 3 the key. The bolt 1 is constructed at opposite sides thereof with longitudinal grooves 4 extending from the end of said bolt and terminating within the body thereof in recesses 5. The grooves 4 at their outer ends are constructed with concaved cam faces 6 for a purpose which will hereinafter appear. The nut 2 is constructed at equidistant intervals with four longitudinal grooves 7, but it will be obvious that this number of grooves is purely arbitrary and may be varied at option. The grooves 7 extend from one of the inner faces of said nut to a point within the body portion thereof and communicate with the central threaded bore.

The key 3 comprises resilient section of metal bent into U-shape to form legs 8 terminating in inwardly directed fingers 9. The legs 8 are connected by a bow shaped portion 10 which is flattened to augment the natural resiliency of the key. It is to be noted that the depth of the groove in the nut, together with the depth of the groove in the bolt, is greater than the thickness of the legs 8.

The key is applied as follows:—The legs 8 are placed in the grooves 4 with the fingers 9 extending in the recesses 5. The legs are then pressed toward each other so that they will lie entirely within the grooves and without projecting therefrom laterally. It will be noted in Fig. 5 of the drawings, that the depth of the grooves 4 and the recesses 5 is such that the legs may be positioned therein as stated. The nut is now slipped over the key and screwed on the bolt, the legs being still held in the grooves 4. When the nut is screwed on the bolt the desired distance, and one of the pair of grooves 7 register with the grooves 4, the legs are released, whereupon they spring into said grooves 7 and thereby lock the nut on the bolt. In this position, the key cannot be removed until the nut is screwed off the bolt, and this cannot be done until the key is again compressed to bring the legs 8 into the grooves 4 as before, because the longitudinal dimension of the groove 7 plus the longitudinal dimension of the groove 4 is less than the length of the fingers 9, as will be perfectly obvious from an inspection of Fig. 5. It will therefore be seen that the lock can readily be applied and removed, but cannot be accidentally or maliciously disengaged, and it therefore most effectually serves the purpose for which it is designed. It is further to be noted that when the lock is in the position indicated in Fig. 5 or when the nut is screwed farther on the bolt, if the threads strip or tend to strip, the portions 9 of the lock will engage the bottoms of the grooves 7 and prevent the entire disengagement of the nut from the bolt.

Having thus described the invention, what is claimed as new, is:—

The combination with a bolt having opposite longitudinal grooves terminating in recesses, and a nut having in the wall of its bore a plurality of longitudinal grooves, of a locking key comprising a pair of resilient legs adapted to enter the aforesaid grooves when they register, and having inwardly directed terminal fingers adapted to seat in the recesses, said fingers being of greater length than the longitudinal dimension of the grooves of the nuts plus the longitudinal dimension of the grooves of the bolt, and the combined depth of the groove in the nut together with the groove in the bolt being greater than the thickness of said legs.

In testimony whereof, I affix my signature, in presence of two witnesses.

PERCY CLAY.

Witnesses:
SAMUEL HARVEY,
GEORGE PATTERSON.